United States Patent Office 2,988,562
Patented June 13, 1961

2,988,562
PROCESS FOR PREPARING A MONOACYL DICYCLOPENTADIENYL IRON
Viktor Weinmayr, Landenberg, Pa., assignor to E. I. du Pont de Nemours and Company, Wilmington, Del., a corporation of Delaware
No Drawing. Filed Apr. 29, 1953, Ser. No. 352,029
5 Claims. (Cl. 260—439)

This invention relates to new ketones containing the dicycloptentadienyliron nucleus and to a process for their preparation.

Organo-metallic compounds in which the metal is directly attached to a hydrocarbon radical make up an extremely important class of compounds. Well-known examples include tetraethyl lead, the universally used antiknock agent, ethyl mercury compounds which are important as fungicides, and the alkyl and aryl derivatives of magnesium, sodium, lithium and the like which are important in organic syntheses. Until very recently, no corresponding organic compounds of iron were known. The first such compound to be discovered was dicyclopentadienyliron, which was first disclosed in an article by Kealy and Pauson, in Nature 168, 1039 (1951) and is claimed in U.S. application Serial No. 291,567, filed June 5, 1952, now Patent No. 2,680,756. This compound is useful as an anti-knock agent, as described in U.S. application Serial No. 277,553, filed March 3, 1952 and now abandoned.

Very recently the preparation of diacyl derivatives of this compound by the reaction of dicyclopentadienyliron with acid chlorides or acid anhydrides using aluminum chloride as the condensing agent has been described by Woodward, Rosenblum and Whiting in J. Am. Chem. Soc. 74, 3458 (1952).

It is an object of the present invention to provide a new class of aliphatic monoacyl derivatives of dicyclopentadienyliron, which are useful as anti-knock agents and which are convenient intermediates in the synthesis of other organo-iron compounds. A further object is the provision of a convenient method for preparing such compounds. Further objects will appear from the description of this invention which follows.

The compounds of this invention are aliphatic monoacyl derivatives of dicyclopentadienyliron. They are stable, crystalline ketones which are soluble in most organic solvents. They may be represented by the general formula $C_{10}H_9FeCOR$, in which R is a monovalent aliphatic hydrocarbon radical ordinarily containing less than 20 and preferably less than 10 carbon atoms. Typical of the compounds which are included by the formula shown above are those in which R represents methyl, ethyl, butyl, decamethyl and the like. The point of attachment of the acyl group to the cyclopentadienyl nucleus is not known with certainty. In fact, if the formulation of Wilkinson et al. in J. Am. Chem. Soc. 74, 2125 (1952) is accepted, all five positions on the cyclopentadienyl ring are equivalent and no isomerism is possible.

The compounds of this invention are readily prepared by reacting dicyclopentadienyliron with an aliphatic acylating agent at a temperature between 20° and 120° C., in the presence of an inorganic non-oxidizing acid which is at least as strong an acid as hydrogen fluoride. The acylating agents usable in this process are the carboxylic acid anhydrides, the carboxylic acid halides and the free carboxylic acids. The acid anhydrides are preferred acylating agents, particularly when the lower acyl radicals are to be introduced into the dicyclopentadienyliron structure.

Any inorganic acid which does not react with dicyclopentadienyliron and which is at least as trong an acid as hydrogen fluoride, i.e., has an ionization constant of at least $7.2 \times 10^{-4}$, may be used as the condensation catalyst. The term "non-oxidizing acid" is intended to exclude strong oxidizing agents such as sulfuric, nitric, chloric and perchloric acids and the like. Acids which are useful in this process include hydrogen fluoride, hydrogen chloride, hydrogen bromide and phosphoric acid. Anhydrous hydrogen fluoride and phosphoric acid (85%) are preferred condensation catalysts. The acid may be used in catalytic amount, in the range of 1 to 20% based on the dicyclopentadienyliron, or may be used in greater amount and serve also as the reaction medium. Excellent results are obtainable by carrying out the reaction in a concentrated solution of the reactants in anhydrous hydrogen fluoride. The concentration of such a solution is preferably at least 50%. Successful acylation in somewhat lower conversion is obtainable by operating in the presence of an inert diluent such as benzene. When the acetyl radical is to be incorporated, glacial acetic acid makes a suitable reaction medium.

The reaction is carried out at a temperature between 20° and 120° C. and preferably between 30° and 100° C. Below 20° C. the reaction proceeds very slowly, while above 100° C. there is apt to be some formation of tarry by-products. With hydrogen fluoride as the condensing agent, temperatures between 30° and 60° are particularly satisfactory. It is usually desirable to use an excess of the acylating agent. This produces no unwanted by-products as there is little tendency to form highly acylated products.

When substantial amounts of unreacted dicyclopentadienyliron remain in the mixture after the reaction has taken place, the crude acyl derivative is best removed by extracting with aqueous methanol and subsequently recrystallizing from n-heptane or isooctane. When higher conversions have been achieved, it is preferable to separate the acyl derivative from such tarry by-products as may be present by vacuum sublimation.

The preparation of the compounds of this invention is illustrated by the following examples.

*Example 1*

Into a 1000 ml. capacity stainless steel vessel are charged 200 g. of acetic anhydride and 65 g. of dicyclopentadienyliron (M.P. 174° C.). The vessel is closed, cooled to below 0° C., and connected with a container of anhydrous hydrogen fluoride. From 300 to 330 g. of anhydrous hydrogen fluoride are added to the charge over a period of about 15 minutes while cooling is maintained to keep the temperature below 10° C. The hydrogen fluoride container is then disconnected and the reaction vessel is agitated. The temperature of the charge is raised to 40° over a period of two hours and agitation is continued at 40–43° for 12 hours. The charge is then poured into 2000 g. of cold water while keeping the temperature of the dilution mass below 40° C. An orange-colored crystalline precipitate of acetylcyclopentadienyl (cyclopentadienyl)iron is obtained. After filtration, washing, and drying it weighs 62 g. equal to a yield of 83% based on dicyclopentadienyliron. It melts at 83–84° C. and is pure enough for most uses. Upon crystallization from isooctane, pure acetylcyclopentadienyl(cyclopentadienyl)iron is obtained in the form of dark orange needles melting at 86° C. Repeated crystallization does not change this melting point. *Anal.*—Calcd. for $$C_{12}H_{12}FeO:$$

C, 63.2; H, 5.3; Fe, 24.5; M.W. 228. Found: C, 63.4; H, 5.31; Fe, 24.31; M.W. in benzene 213. The compound is soluble with a cerise color both in 96% sulfuric acid and in 36% hydrochloric acid. It can be distilled at atmospheric pressure without decomposition. The compound is further identified by its infra-red spectrum, as measured in mineral oil, in which characteristic absorption bands appear at the following wave lengths: 6.05, 7.82, 8.96, 9.07, 9.58, 9.95, 11.20, 11.79 and 12.16 microns.

*Example 2*

A mixture of 93 g. (0.5 mole) of dicyclopentadienyliron, 250 ml. of acetic anhydride, and 20 ml. of 85% phosphoric acid is prepared at room temperature and then heated at 100° C. for 10 minutes. The reaction mixture is cooled slightly and poured directly onto ice. After standing overnight, excess acetic anhydride hydrolyzes to acetic acid and the mixture is neutralized with 200 g. of sodium carbonate monohydrate in 200 ml. of water. The final mixture is a brown pasty mass which is cooled in an ice bath and filtered. The tan product is washed four times with 100 ml. of water and sucked dry on the filter. The granular product is air dried for 24 hours and then dried in a vacuum desiccator over phosphoric anhydride. Sublimation of the crude product at 100° C. and 1 mm. pressure gives 81.5 g. of an orange crystalline product representing 0.357 mole or 71.4% yield of monoacetyl derivative. The product contains a small amount of unreacted dicyclopentadienyliron which is removed by recrystallization from n-heptane. *Anal.*—Calcd. for acetylcyclopentadienyl(cyclopentadienyl)iron, $C_{12}H_{12}FeO$: C, 63.17; H, 5.30; Fe, 24.48; M.W. 228. Found: C, 63.02, 62.62; H, 5.34, 5.32; Fe, 24.78, 24.88; M.W. 226, 246 (in benzene).

*Example 3*

A mixture of 33.3 g. (0.18 mole) of dicyclopentadienyliron, 200 ml. of benzene, and 4 ml. of 85% phosphoric acid is treated with 25 g. (0.245 mole) acetic anhydride during a 40-minute period at room temperature. The mixture is then heated at reflux temperature for 2 hours, cooled and poured into 500 ml. of cold water. The benzene layer is separated and the aqueous phase extracted two times with 100 ml. of ether. The combined organic solution is extracted three times with 75 ml. of water and evaporated to dryness. The crude product is extracted with a hot solution of 200 ml. of methanol and 25 ml. of water. This removes 3.7 g. of crude monoacetyl-derivative and leaves 27 g. of unreacted dicyclopentadienyliron. The monoacetyl derivative is obtained in 9% conversion based on the original amount of dicyclopentadienyliron, and 46% yield based on the amount of the starting material which is consumed.

The new compounds of this invention are useful as antiknock agents for spark ignition engines, have utility in the preparation of dyes, and are extremely important as starting materials for the synthesis of other derivatives of dicyclopentadienyliron.

This application is a continuation-in-part of my co-pending application, U.S. Serial No. 312,852, filed October 2, 1952 and now abandoned.

I claim:

1. The process for preparing a monoacyl dicyclopentadienyliron in which the acyl radical has the formula R–CO— wherein R represents an alkyl radical of up to 10 carbon atoms, which comprises reacting dicyclopentadienyliron with an alkyl acylating agent in which the alkyl radical contains up to 10 carbon atoms at a temperature between 20° C. and 120 C. in the presence of an inorganic non-oxidizing acid which is at least as strong an acid as hydrogen fluoride.

2. The process of claim 1 in which the inorganic acid is anhydrous hydrogen fluoride.

3. The process of claim 1 in which the acylating agent is an acid anhydride having the formula $(R—CO)_2O$ wherein R represents an alkyl radical of up to 10 carbon atoms.

4. The process of claim 1 in which the acylating agent is acetic anhydride.

5. The process for preparing acetylcyclopentadienyl (cyclopentadienyl)iron which comprises reacting dicyclopentadienyliron with acetic anhydride at a temperature between 30° C. and 60° C. in the presence of anhydrous hydrogen fluoride.

References Cited in the file of this patent

UNITED STATES PATENTS

| | | |
|---|---|---|
| 2,680,756 | Pauson | June 8, 1954 |
| 2,683,157 | Weinmayr | July 6, 1954 |
| 2,694,721 | Weinmayr | Nov. 16, 1954 |

OTHER REFERENCES

Woodward et al.: J. Am. Chem. Soc., vol. 74, pages 3458–3459, July 5, 1952.

Simons: Fluorine Chemistry, pages 276–277, Academic Press Inc., New York city (1950).